United States Patent
Liu et al.

(10) Patent No.: US 11,960,030 B2
(45) Date of Patent: Apr. 16, 2024

(54) DEVICE AND METHOD FOR REAL-TIME MEASURING THE SPECTRUM OF AIRBORNE HYPERSPECTRAL IMAGING LiDAR

(71) Applicant: HEFEI INSTITUTE OF PHYSICAL SCIENCE, CHINESE ACADEMY OF SCIENCES, Anhui (CN)

(72) Inventors: Dong Liu, Anhui (CN); Liyong Qian, Anhui (CN); Decheng Wu, Anhui (CN); Xiaojun Zhou, Anhui (CN); Liujun Zhong, Anhui (CN); Wei Wei, Anhui (CN); Wenju Wang, Anhui (CN); Yingjian Wang, Anhui (CN)

(73) Assignee: HEFEI INSTITUTE OF PHYSICAL SCIENCE, CHINESE ACADEMY OF SCIENCES, Hefei (CN)

( * ) Notice: Subject to any disclaimer, the term of this patent is extended or adjusted under 35 U.S.C. 154(b) by 52 days.

(21) Appl. No.: 17/577,266

(22) Filed: Jan. 17, 2022

(65) Prior Publication Data

US 2022/0146641 A1 May 12, 2022

Related U.S. Application Data

(63) Continuation of application No. PCT/CN2020/112133, filed on Aug. 28, 2020.

(30) Foreign Application Priority Data

Nov. 28, 2019 (CN) .......................... 201911187168.7

(51) Int. Cl.
G01S 7/481 (2006.01)
G01S 7/484 (2006.01)
G01S 7/486 (2020.01)

(52) U.S. Cl.
CPC .......... *G01S 7/4817* (2013.01); *G01S 7/4818* (2013.01); *G01S 7/484* (2013.01); *G01S 7/486* (2013.01)

(58) Field of Classification Search
CPC ...... G01S 7/4817; G01S 7/4818; G01S 7/484; G01S 7/486
See application file for complete search history.

(56) References Cited

U.S. PATENT DOCUMENTS

2008/0037108 A1\* 2/2008 Yokoyama .............. G02F 1/383
359/328

FOREIGN PATENT DOCUMENTS

CN 104777487 A \* 7/2015 ............. G01N 21/49
CN 104777487 A 7/2015
(Continued)

OTHER PUBLICATIONS

International Search Report of PCT/CN2020/112133.
(Continued)

*Primary Examiner* — Jamil Ahmed

(57) ABSTRACT

The invention relates to the technical field of radar detection, in particular to a device for real-time detection of spectrum from airborne hyperspectral imaging LiDAR and method thereof. The device comprises a laser and a reference module; the reference module comprises a first reflecting mirror and a second reflecting mirror with a given transmittance; the first reflecting mirror and the second reflecting mirror are arranged with a focusing mirror and an optical fiber in sequence therebetween. The laser emits a laser light to the first reflecting mirror with a given transmittance, and the beam of the laser light transmitted through the first reflecting mirror after passing the focusing mirror is used as the reference beam after passing the optical fiber. The invention enables detection of the spectral line of each pulse (Continued)

and improves the precision of reflection spectrum of the ground object measured by the system.

5 Claims, 1 Drawing Sheet

(56) References Cited

FOREIGN PATENT DOCUMENTS

| CN | 107193015 A | | 9/2017 | | |
|---|---|---|---|---|---|
| CN | 109343024 A | * | 2/2019 | ............... | G01S 7/48 |
| CN | 109343024 A | | 2/2019 | | |
| CN | 110850436 A | | 2/2020 | | |
| KR | 100324112 B1 | * | 2/2002 | ............... | G02B 5/08 |
| WO | 2016208013 A1 | | 12/2016 | | |

OTHER PUBLICATIONS

Written Opinion of PCT/CN2020/112133.
Chen, Zhen, "The Research on All Fiber Coherent Wind LIDAR," Chinese Doctoral Dissertations Full-text Database Electronic Journal, No. 7, Jul. 31, 2016, p. 39-51, ISSN: 1674-0246, CN.

* cited by examiner

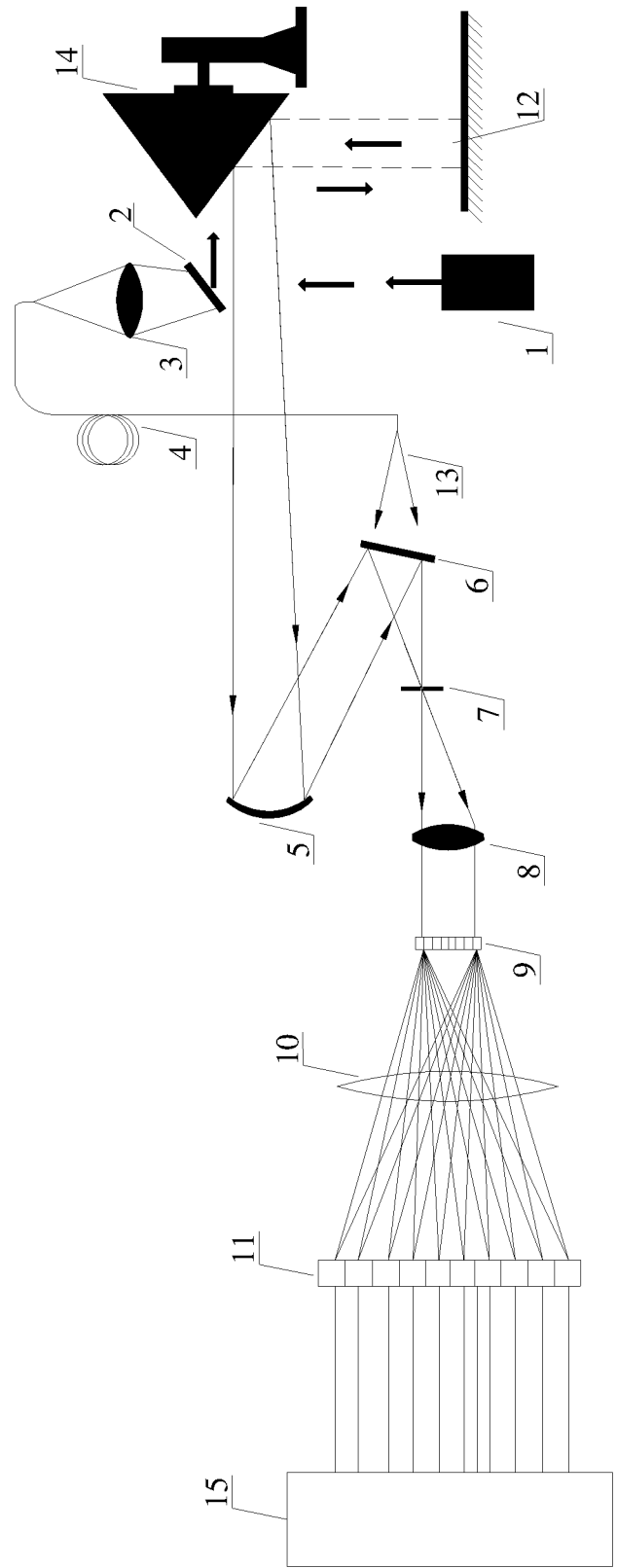

DEVICE AND METHOD FOR REAL-TIME MEASURING THE SPECTRUM OF AIRBORNE HYPERSPECTRAL IMAGING LiDAR

CROSS-REFERENCE TO RELATED APPLICATIONS

This application is a bypass continuation application of PCT application no.: PCT/CN2020/112133. This application claims priorities from PCT Application PCT/CN2020/112133, filed Aug. 28, 2020, and from Chinese patent application no.: 201911187168.7 filed Nov. 28, 2019, the contents of which are incorporated herein in the entirety by reference

FIELD OF THE INVENTION

The invention relates to the technical field of LiDAR detection, in particular to a device and method for real-time measuring the spectrum of airborne hyperspectral imaging LiDAR.

BACKGROUND OF THE INVENTION

The light source used by hyperspectral imaging LiDAR is a high-repetition-frequency supercontinuum white light laser. The spectral line of each laser pulse emitted by the laser changes considerably due to the light emitting mechanism of the laser and other factors. The influence of the spectral line from the laser itself on the detection results cannot be precisely eliminated in subsequent data processing of the return signal, which leads to distortion of the target spectral line scanned by the LiDAR.

In this case, generally, a conventional terrestrial imaging LiDAR scans a target multiple times, and multiple return signals scattered by the same target are accumulated and subsequently averaged. The process of such accumulation is to average the spectral line of laser pulse emitted by the laser. After multiple accumulations, the spectral line of the laser pulse emitted by the laser may be theoretically considered an approximation of the spectral line calibrated during the delivery detection for the laser.

For an airborne hyperspectral imaging LiDAR, it is not possible to implement the method of scanning the same target and then averaging the signal with the laser pulse multiple times.

SUMMARY OF THE INVENTION

In order to precisely obtain the spectral line of a ground object target in the process of data processing for the return signal from airborne hyperspectral imaging LiDAR, the invention provides a device for real-time detection of spectrum from airborne hyperspectral imaging LiDAR and method thereof, by specifically adopting the following technical solutions:

A device for real-time detection of spectrum from airborne hyperspectral imaging LiDAR comprises a laser and a reference module. The reference module comprises a first reflecting mirror and a second reflecting mirror with a given transmittance. The first reflecting mirror and the second reflecting mirror are arranged with a focusing mirror and an optical fiber in sequence therebetween. The laser emits a laser light to the first reflecting mirror with a given transmittance, and the beam of the laser light transmitted through the first reflecting mirror after passing the focusing mirror is used as the reference beam after passing the optical fiber.

Specifically, the device comprises an emitting module with a laser and a rotating mirror. The rotating mirror is used to reflect the laser light reflected by the first reflecting mirror to the target.

Specifically, the device comprises a receiving module with a receiving telescope, a second reflecting mirror, a diaphragm, a collimating paraboloidal mirror, a grating, a telecentric lens, a beam coupler and a detecting and processing unit arranged in sequence. The detecting and processing unit comprises a detector that receives the light output by the beam coupler and a processor that receives and processes the signal from the detector. The reference beam is emitted to the back side of the second reflecting mirror and transmitted to converge with the detecting beam emitted by the receiving telescope to the front side of the second reflecting mirror.

Specifically, the first reflecting mirror and the second reflecting mirror are provided with a cladding layer on both sides, with a transmittance below 0.1%.

Specifically, the optical fiber is a multi-mode optical fiber with a core diameter of 200 μm.

Specifically, the emitting module comprises a supercontinuum high-repetition-frequency laser that emits laser light.

A method for using the above device for real-time detection of spectrum from airborne hyperspectral imaging LiDAR, comprising the following steps:

S1. According to the return signal power $P_R(\lambda, z)$ in the hyperspectral LiDAR equation and the power spectrum of the reference light $P_{Ref}(\lambda)$ detected by the detector, where $$P_R(\lambda, z) = o(\lambda)\beta_0(\lambda)\frac{D_R^2}{8z^2}[T_{atm}(\lambda, 0, z)]_2,$$

$\lambda$ is the central wavelength $\lambda_{NCW}$ of each channel obtained during spectrum calibration, $P_R(\lambda, z)$ is the optical power of the return signal received by the LiDAR channel with the central wavelength of $\lambda$, in the unit of W; $\beta_G(\lambda)$ is the reflectivity of the ground object; $D_R$ is the effective clear aperture of the receiving telescope, in the unit of m; z is the distance between the LiDAR and the measured ground surface, in the unit of m, z can be measured in real time through the ranging channel; $T_{atm}(\lambda, O, z)$ is the transmittance of the atmosphere between the LiDAR and the measured ground surface at wavelength of $\lambda$; $c(\lambda)=\rho_0\eta(\lambda)\Delta\lambda\epsilon$, $c(\lambda)$ is the power intensity of the light pulse energy emitted by the laser (1) into the detector in the radar system, and $\rho_0$ is the average spectral power density output by the laser (1), in the unit of W/nm; $\eta(\lambda)$ is a normalized function of the power density spectrum of the average spectral power density of the laser (1); $\Delta\lambda$ is the corresponding spectral bandwidth in one channel, in the unit of nm; $\epsilon(\lambda)$ is the optical efficiency of the LiDAR system.

Further, a corner reflector is adopted to introduce part of the laser light scanning the ground object target through a rotating mirror to the receiving module, and to obtain a power spectrum $P_{Cor}(?)$ of the laser light received by the detector;

S2. According to the data from each formula in step S1, the power intensity c ($\lambda$) is obtained of the light pulse energy emitted by the laser into the detector in the radar system.

The step S1 is as follows:

(a). The formula of return signal power $P_R(\lambda, z)$ according to the hyperspectral LiDAR equation is as follows:

$$P_R(\lambda, z) = \rho_0 \eta(\lambda) \Delta \lambda \beta_0(\lambda) \frac{D_R^2}{8z^2} \varepsilon(\lambda) [T_{atm}(\lambda, 0, z)]^2 \quad (1)$$

(b). The capture card in the processor captures the signal intensity of the reference light through sequential control, and the power spectrum of the reference light detected by the detector is:

$$P_{Ref}(\lambda) = \rho_0 \eta(\lambda) \Delta \lambda \varepsilon(\lambda) R(\lambda) \quad (2)$$

$R(\lambda)$ is the optical efficiency of the reference light during introduction;

In addition, the optical power received by the detector can be further expressed as:

$$P_{Ref}(\lambda) = \frac{I_{Ref}(\lambda)}{R} \quad (3)$$

$I_{Ref}(\lambda)$ is the electrical signal intensity of the reference light in the corresponding channel of the radar system. R is the responsivity of the detector in the corresponding channel of the radar system;

(c). A corner reflector is adopted to introduce part of the laser light scanning the ground object target through a rotating mirror to the receiving module, at this time the laser power spectrum received by the detector in the radar system is: C, $$P_{Cor}(\lambda) = \rho_0 \eta(\lambda) \Delta \lambda \varepsilon(\lambda) Q(\lambda) = \frac{I_{Cor}(\lambda)}{R} \quad (4)$$

$Q(\lambda)$ is the optical efficiency reflected by the corner reflector that can be accurately detected.

The step S2 is as follows:

S21. Formula (2) is divided by Formula (4) to obtain:

$$\frac{P_{Ref}(\lambda)}{P_{Cor}(\lambda)} = \frac{R(\lambda)}{Q(\lambda)} = \frac{I_{Ref}(\lambda)}{I_{Cor}(\lambda)} \quad (5)$$

and the optical efficiency $R(\lambda)$ of the reference light during introduction is obtained;

S22. The power intensity $C(\lambda)$ from the power spectrum of the reference light is obtained by substituting into Formula (2):

$$C(\lambda) = \frac{I_{Ref}(\lambda)}{R(\lambda) R} \quad (6)$$

Based on Formula (6), the laser spectrum of each pulse emitted by the laser into the corresponding channel according to the reference light can be used to obtain the power intensity of the light pulse energy emitted by the laser into the detector in the radar system.

The invention has the following advantages:

(1) After the laser pulse is transmitted through the first reflecting mirror, part of the light will penetrate the first reflecting mirror. Such part is used as the reference light. An optical fiber is used to couple the reference light into the radar system, so as to detect the spectral line of each pulse, which improves the precision of reflection spectrum of the ground object measured by the system.

(2) When the airborne hyperspectral imaging LiDAR is in operation, the supercontinuum high-repetition-frequency laser emits a laser pulse. After the pulse passes through the first reflecting mirror, part of the light scans the ground object target through the rotating mirror, and the return signal returns coaxially. Subsequently, the light enters the radar system through the rotating mirror. After passing the receiving telescope, the light is transmitted to the surface of the second reflecting mirror, through which its direction is altered once. The small-hole diaphragm inhibits the background stray light signal. The light is transmitted to the surface of the transmission-type grating through the collimating paraboloidal mirror. After being split by the grating, the light couples with the beam through the telecentric lens, thus the return signal of different bands is coupled to the corresponding detection channel of the detector in the detecting and processing unit.

(3) The reference light is coupled to the surface of the second reflecting mirror. Both sides of the second reflecting mirror are subject to cladding treatment. This allows most of the pulse emitted by the laser to be reflected and just a slight amount to be transmitted, which is similar to attenuation to the reference light signal. Such design has a unique technical advantage to ensure that the return signal and the reference light signal are on the same magnitude as far as possible.

(4) The reference light is coupled through the multi-mode optical fiber to the surface of the second reflecting mirror and then passes through the small-hole diaphragm. Such design reduces the influence of any stray light produced by uncollimated reference light on the precision of detection for the ground object target. In addition, the reference light is directly coupled through the optical fiber into the radar system, so the laser spectrum emitted by the laser can be detected directly by the components of the radar system itself, rather than an external spectrograph accessory system.

(5) The device-based method can be used to detect the laser spectrum from airborne hyperspectral imaging LiDAR in real time, realizing high-precision acquisition of backscattering spectrum data of the ground object target.

BRIEF DESCRIPTION OF THE DRAWINGS

FIG. 1 is a structural diagram of the device in the invention.

Designations in the drawing:

1—laser 2—first reflecting mirror 3—focusing mirror 4—optical fiber 5—receiving telescope 6—second reflecting mirror 7—diaphragm 8—collimating paraboloidal mirror 9—grating 10—telecentric lens 11—beam coupler 12—ground object target 13—reference light 14—rotating mirror 15—processor

DETAILED DESCRIPTION OF THE PREFERRED EMBODIMENTS

As shown in FIG. 1, the device for real-time detection of the spectrum from airborne hyperspectral imaging LiDAR comprises an emitting module, a receiving module and a reference module.

The emitting module comprises a supercontinuum high-repetition-frequency laser 1 that emits laser light and a rotating mirror 14. The rotating mirror 14 is used to reflect the laser light reflected by a first reflecting mirror 2 to the target.

The receiving module comprises a receiving telescope 5, a second reflecting mirror 6, a diaphragm 7, a collimating paraboloidal mirror 8, a grating 9, a telecentric lens 10, a beam coupler 11 and a detecting and processing unit arranged in sequence. The detecting and processing unit comprises a detector that receives the light output by the beam coupler 11 and a processor that receives and processes the signal from the detector. The light received by the receiving telescope 5 is emitted to the front side of the second reflecting mirror 6.

The reference module comprises a first reflecting mirror 2 and a second reflecting mirror 6 with a given transmittance. The first reflecting mirror 2 and the second reflecting mirror 6 are arranged with a focusing mirror 3 and an optical fiber 4 in sequence therebetween. The emitting module emits a laser light to the first reflecting mirror 2 with a given transmittance, and the beam of the laser light transmitted through the first reflecting mirror 2 after passing the focusing mirror 3 is used as the reference beam after passing the optical fiber 4. The reference beam is emitted to the back side of the second reflecting mirror 6 and transmitted to converge with the detecting beam emitted by the receiving telescope 5 to the front side of the second reflecting mirror 6. There is a magnitude difference between the length of the optical fiber 4 and the airborne height. In this solution, the first reflecting mirror 2 and the second reflecting mirror 6 are provided with a cladding layer on both sides, with a transmittance below 0.1%. In this solution, the optical fiber 4 is a multi-mode optical fiber 4 with a length of 100 m and a core diameter of 200 μm. After the laser pulse is transmitted through the first reflecting mirror 2, part of the light will penetrate the reflecting mirror. Such part is used as the reference light. An optical fiber 4 is used to couple the reference light 13 into the radar system, so as to measure the spectral line of each pulse, which improves the precision of reflection spectrum of the ground object measured by the system.

When the airborne hyperspectral imaging LiDAR is in operation, the supercontinuum high-repetition-frequency laser 1 emits a laser pulse. After the pulse passes through the first reflecting mirror 2, part of the light scans the ground object target 12 through the rotating mirror 14, and the return signal returns coaxially. The light then enters the radar system through the rotating mirror 14. After passing the receiving telescope 5, the light is transmitted to the surface of the second reflecting mirror 6, through which its direction is altered once. The small-hole diaphragm 7 inhibits the background stray light signal. The light is transmitted to the surface of the transmission-type grating 9 through the collimating paraboloidal mirror 8. After being split by the grating 9, the light couples with beam through the telecentric lens 10, thus the return signal of different bands is coupled to the corresponding detection channel of the detector in the detecting and processing unit.

The reference light 13 is coupled to the surface of the second reflecting mirror 6. Both sides of the second reflecting mirror 6 are subject to cladding treatment. This allows most of the pulse emitted by the laser 1 to be reflected and just a slight amount to be transmitted, which is similar to attenuation to the reference light signal. Such design has a unique technical advantage to ensure that the return signal and the reference light signal are on the same magnitude as far as possible.

The reference light 13 is coupled through the multi-mode optical fiber 4 to the surface of the second reflecting mirror 6 and then passes through the small-hole diaphragm 7. Such design reduces the influence of any stray light produced by uncollimated reference light 13 on the precision of detection for the ground object target 12. In addition, the reference light 13 is directly coupled through the optical fiber 4 into the radar system, so the laser spectrum emitted by the laser 1 can be measured directly by the components of the radar system itself, rather than an external spectrograph accessory system.

The method for using the above device for real-time detection of spectrum from airborne hyperspectral imaging LiDAR comprises the following steps:

S1. According to the return signal power $P_R(\lambda, z)$ in the hyperspectral LiDAR equation and the power spectrum of the reference light 13 $P_{Ref}(\lambda)$ detected by the detector, where $$P_R(\lambda, z) = o(\lambda)\beta_0(\lambda)\frac{D_R^2}{8z^2}[T_{atm}(\lambda, 0, z)]_2,$$

$\lambda$ is the central wavelength $\lambda_{NCW}$ of each channel obtained during spectrum calibration, $P_R(\lambda, z)$ is the optical power of the return signal received by the LiDAR channel with the central wavelength of $\lambda$, in the unit of W; $\beta_G(\lambda)$ is the reflectivity of the ground object; $D_R$ is the effective clear aperture of the receiving telescope 5, in the unit of m; z is the distance between the LiDAR and the measured ground surface, in the unit of m, z can be measured in real time through the ranging channel; $T_{atm}(\lambda, O, z)$ is the transmittance of the atmosphere between the LiDAR and the measured ground surface at wavelength of $\lambda$; $c(\lambda) = \rho_0 \eta(\lambda) \Delta\lambda\varepsilon$, $c(\lambda)$ is the power intensity of the light pulse energy emitted by the laser (1) into the detector in the radar system, and $\rho_0$ is the average spectral power density output by the laser 1, in the unit of W/nm; $\eta(\lambda)$ is a normalized function of the power density spectrum of the average spectral power density of the laser 1; $\Delta\lambda$ is the corresponding spectral bandwidth in one channel, in the unit of nm; $\varepsilon(\lambda)$ is the optical efficiency of the LiDAR system.

Further, a corner reflector is adopted to introduce part of the laser light scanning the ground object target 12 through the rotating mirror 14 to the receiving module, and to obtain a power spectrum $P_{Cor}(\lambda)$ of the laser light received by the detector;

Specifically, the step S1 is as follows:

(a). The formula of return signal power $P_R(\lambda, z)$ according to the hyperspectral LiDAR equation is as follows:

$$P_R(\lambda, z) = \rho_0\eta(\lambda)\Delta\lambda\beta_0(\lambda)\frac{D_R^2}{8z^2}\varepsilon(\lambda)[T_{atm}(\lambda, 0, z)]^2 \quad (1)$$

(b). The capture card in the processor captures the signal intensity of the reference light 13 through sequential control, and the power spectrum of the reference light 13 detected by the detector is:

$$P_{Ref}(\lambda) = \rho_0\eta(\lambda)\Delta\lambda\varepsilon(\lambda)R(\lambda) \quad (2)$$

R (λ) is the optical efficiency of the reference light 13 during introduction under the influence of transmittance of the reflecting mirror, transmittance of the optical fiber 4, coupling efficiency and other factors;

In addition, the optical power-received by the detector can be further expressed as:

$$P_{Ref}(\lambda) = \frac{I_{Ref}(\lambda)}{R} \quad (3)$$

$I_{Ref}$ (λ) is the electrical signal intensity of the reference light 13 in the corresponding channel of the radar system. R is the responsivity of the detector in the corresponding channel of the radar system;

(c). A corner reflector is adopted to introduce part of the laser light scanning the ground object target 12 through a rotating mirror 14 to the receiving module, at this time the laser power spectrum received by the detector in the radar system is:

$$P_{Cor}(\lambda) = \rho_0 \eta(\lambda) \Delta\lambda \varepsilon(\lambda) Q(\lambda) = \frac{I_{Cor}(\lambda)}{R} \quad (4)$$

Q (λ) is the optical efficiency reflected by the corner reflector that can be accurately detected.

S2. According to the data from each formula in step S1, the power intensity c (λ) of the light pulse energy emitted by the laser (1) into the detector in the radar system.

The step S2 is as follows:

S21. Formula (2) is divided by Formula (4) to obtain:

$$\frac{P_{Ref}(\lambda)}{P_{Cor}(\lambda)} = \frac{R(\lambda)}{Q(\lambda)} = \frac{I_{Ref}(\lambda)}{I_{Cor}(\lambda)} \quad (5)$$

and the optical efficiency R (λ) of the reference light 13 during introduction is obtained;

S22. The power intensity C (λ) from the power spectrum of the reference light 13 is obtained by substituting into Formula (2):

$$C(\lambda) = \rho_0 \eta(\lambda) \Delta\lambda \varepsilon(\lambda) = \frac{I_{Ref}(\lambda)}{R(\lambda)R} \quad (6)$$

Based on Formula (6), the laser spectrum of each pulse emitted by the laser 1 into the corresponding channel according to the reference light can be used to obtain the power intensity of the light pulse energy emitted by the laser 1 into the detector in the radar system.

The above are the preferred embodiments rather than the limitations of the invention. Any amendment, equivalent replacement and improvement made within the range of the spirit and rule of the invention shall be included in the protection scope of the invention.

The invention claimed is:

1. A device for real-time measuring the spectrum of airborne hyperspectral imaging LiDAR, comprising a laser, a reference module, an emitting module, and a receiving module, wherein the reference module comprises a first reflecting mirror (2) and a second reflecting mirror (6) with a given transmittance; the first reflecting mirror (2) and the second reflecting mirror (6) are arranged with a focusing mirror (3) and an optical fiber (4) in sequence therebetween; the laser emits a laser light to the first reflecting mirror (2) with a given transmittance, and the beam of the laser light transmitted through the first reflecting mirror (2) after passing the focusing mirror (3) is used as a reference beam after passing the optical fiber (4); the emitting module comprises a laser and a rotating mirror (14); the rotating mirror (14) is used to reflect the laser light reflected by the first reflecting mirror (2) to the target; and the receiving module further comprises a receiving telescope (5), a second reflecting mirror (6), a diaphragm (7), a collimating paraboloidal mirror (8), a grating (9), a telecentric lens (10), a beam coupler (11) and a detecting and processing unit arranged in sequence; the detecting and processing unit comprises a detector that receives the light output by the beam coupler (11) and a processor (15) that receives and processes the signal from the detector; the reference beam is emitted to the back side of the second reflecting mirror (6) and transmitted to converge with the detecting beam emitted by the receiving telescope (5) to the front side of the second reflecting mirror (6); and the optical fiber (4) is a multi-mode optical fiber (4) with a core diameter of 200 μm;

wherein the device for real-time measuring the spectrum of airborne hyperspectral imaging LiDAR is used according to a method comprising the following steps:

S1. according to the return signal power $P_R$ (λ, z) in the hyperspectral LiDAR equation and the power spectrum of the reference light (13) $P_{Ref}$ (λ) detected by the detector, where $$P_R(\lambda, z) = o(\lambda)\beta_0(\lambda)\frac{D_R^2}{8z^2}[T_{atm}(\lambda, 0, z)]_2,$$

λ is the central wavelength $\lambda_{NCW}$ of each channel obtained during spectrum calibration, $P_R$ (λ, z) is the optical power of the return signal received by the LiDAR channel with the central wavelength of λ, in the unit of W; $\beta_G$ (λ) is the reflectivity of the ground object; $D_R$ is the effective clear aperture of the receiving telescope (5), in the unit of m; z is the distance between the LiDAR and the measured ground surface, in the unit of m, and z can be measured in real time through the ranging channel; $T_{atm}$ (λ, O, z) is the transmittance of the atmosphere between the LiDAR and the measured ground surface at wavelength of λ; c(λ)=$\rho_0\eta(\lambda)\Delta\lambda\varepsilon$, c (λ) is the power intensity of the light pulse energy emitted by the laser (1) into the detector in the radar system, and $\rho_0$ is the average spectral power density output by the laser (1), in the unit of W/nm; η (λ) is a normalized function of the power density spectrum of the average spectral power density of the laser (1); Δλ is the corresponding spectral bandwidth in one channel, in the unit of nm; ε(λ) is the optical efficiency of the LiDAR system;

wherein a corner reflector is adopted to introduce part of the laser light scanning the ground object target (12) through a rotating mirror (14) to the receiving module, and to obtain a power spectrum $P_{Cor}$ (λ) of the laser light received by the detector;

S2. according to the data from each formula in step S1, the power intensity c (λ) is obtained of the light pulse energy emitted by the laser (1) into the detector in the radar system.

2. The device for real-time measuring the spectrum of airborne hyperspectral imaging LiDAR according to claim 1, wherein the first reflecting mirror (2) and the second reflecting mirror (6) are provided with a cladding layer on both sides, with a transmittance below 0.1%.

3. The device for real-time measuring the spectrum of airborne hyperspectral imaging LiDAR according to claim 1, wherein the emitting module comprises a supercontinuum high-repetition-frequency laser (1) that emits laser light.

4. The device for real-time measuring the spectrum of airborne hyperspectral imaging LiDAR according to claim 1 wherein the step S1 is as follows:

(a). the formula of return signal power $P_R(\lambda, z)$ according to the hyperspectral LiDAR equation is as follows:

$$P_R(\lambda, z) = \rho_0 \eta(\lambda) \Delta \lambda \beta_0(\lambda) \frac{D_R^2}{8z^2} \varepsilon(\lambda)[T_{atm}(\lambda, 0, z)]^2 \quad (1)$$

(b). the capture card in the processor (15) captures the signal intensity of the reference light (13) through sequential control, and the power spectrum of the reference light (13) detected by the detector is:

$$P_{Ref}(\lambda) = \rho_0 \eta(\lambda) \Delta \lambda \varepsilon(\lambda) R(\lambda) \quad (2)$$

$R(\lambda)$ is the optical efficiency of the reference light during introduction;
In addition, the optical power received by the detector can be further expressed as:

$$P_{Ref}(\lambda) = \frac{I_{Ref}(\lambda)}{R} \quad (3)$$

$I_{Ref}(\lambda)$ is the electrical signal intensity of the reference light (13) in the corresponding channel of the radar system, and R is the responsivity of the detector in the corresponding channel of the radar system;

(c). a corner reflector is adopted to introduce part of the laser light scanning the ground object target (12) through a rotating mirror (14) to the receiving module, at this time the laser power spectrum received by the detector in the radar system is:

$$P_{Cor}(\lambda) = \rho_0 \eta(\lambda) \Delta \lambda \varepsilon(\lambda) Q(\lambda) = \frac{I_{Cor}(\lambda)}{R} \quad (4)$$

$Q(\lambda)$ is the optical efficiency reflected by the corner reflector that can be accurately detected.

5. The device for real-time measuring the spectrum of airborne hyperspectral imaging LiDAR according to claim 4, wherein the step S2 is as follows:

S21. formula (2) is divided by formula (4) to obtain:

$$\frac{P_{Ref}(\lambda)}{P_{Cor}(\lambda)} = \frac{R(\lambda)}{Q(\lambda)} = \frac{I_{Ref}(\lambda)}{I_{Cor}(\lambda)} \quad (5)$$

and the optical efficiency $R(\lambda)$ of the reference light (13) during introduction is obtained;

S22. the power intensity $C(\lambda)$ from the power spectrum of the reference light (13) is obtained by substituting into formula (2):

$$C(\lambda) = \rho_0 \eta(\lambda) \Delta \lambda \varepsilon(\lambda) = \frac{I_{Ref}(\lambda)}{R(\lambda) R} \quad (6)$$

based on formula (6), the laser spectrum of each pulse emitted by the laser (1) into the corresponding channel according to the reference light can be used to obtain the power intensity of the light pulse energy emitted by the laser (1) into the detector in the radar system.

\* \* \* \* \*